United States Patent [19]

de Graaf

[11] Patent Number: 5,287,651
[45] Date of Patent: Feb. 22, 1994

[54] APPARATUS FOR BULB PLANT CULTIVATION

[75] Inventor: Martien de Graaf, Vijfhuizen, France

[73] Assignee: Isover Saint-Gobain, Courbevoie, France

[21] Appl. No.: 648,965

[22] Filed: Jan. 31, 1991

[30] Foreign Application Priority Data

Jan. 31, 1990 [FR] France ................ 90 01114

[51] Int. Cl.$^5$ ............................. A01G 9/02
[52] U.S. Cl. ............................. 47/66; 47/74
[58] Field of Search ............ 47/66, 74, 56, 73

[56] References Cited

U.S. PATENT DOCUMENTS

| | | | |
|---|---|---|---|
| 1,486,431 | 3/1924 | Harvey | 47/74 |
| 2,799,972 | 7/1957 | Teixeira | 47/66 |
| 2,858,647 | 11/1958 | Cotton | 47/74 |
| 3,112,577 | 12/1963 | Bürger . | |
| 3,273,284 | 9/1966 | Anagnostou | 47/74 |
| 3,513,593 | 5/1970 | Beck | 47/87 |
| 3,604,150 | 9/1971 | Baumann | 47/66 |
| 3,608,238 | 9/1971 | Reuter . | |
| 3,678,620 | 7/1972 | Voges | 47/73 |
| 4,777,763 | 10/1988 | Shannon et al. . | |

FOREIGN PATENT DOCUMENTS

| | | | |
|---|---|---|---|
| 176134 | 4/1986 | . | |
| 3719245 | 12/1988 | Fed. Rep. of Germany | 47/66 |
| 2603767 | 3/1988 | France | 47/66 |
| 944597 | 12/1963 | United Kingdom | 47/56 |

Primary Examiner—Ramon S. Britts
Assistant Examiner—Joanne C. Downs
Attorney, Agent, or Firm—Oblon, Spivak, McClelland, Maier & Neustadt

[57] ABSTRACT

Apparatus for the greenhouse cultivation of flower bulbs wherein the bulbs are placed in pockets (6) made in a hydrophilic mineral wool felt (5). The pockets (6) are formed at regular intervals and open only on one face of the felt. The opening formed in each pocket is of a slightly smaller size than the maximum diameter of a bulb (3) intended to be received in the pocket. The depth of each pocket is sufficient for the bulb (3) positioned therein to penetrate the pocket at least to the level of its largest section.

9 Claims, 1 Drawing Sheet

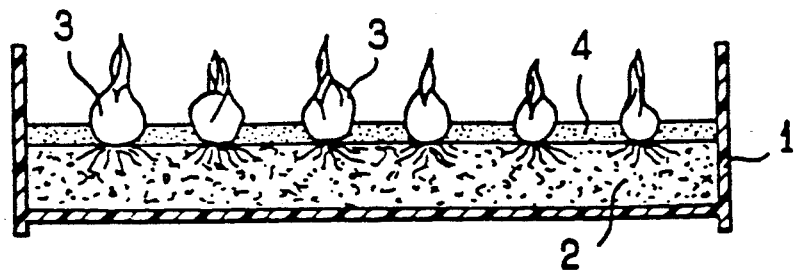
FIG_1 (PRIOR ART)
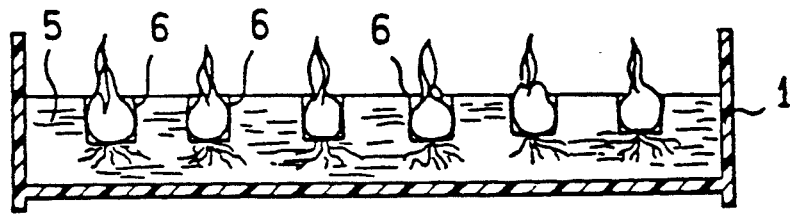
FIG_2
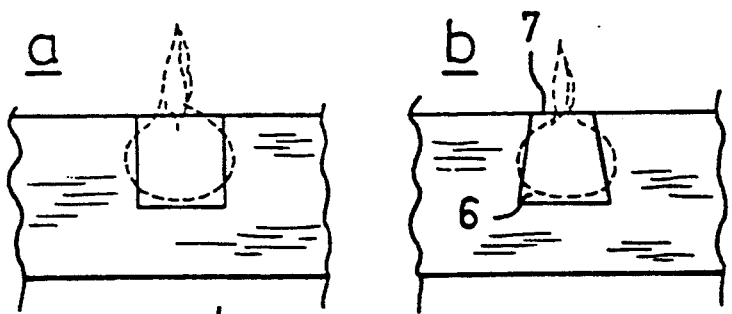
FIG_3
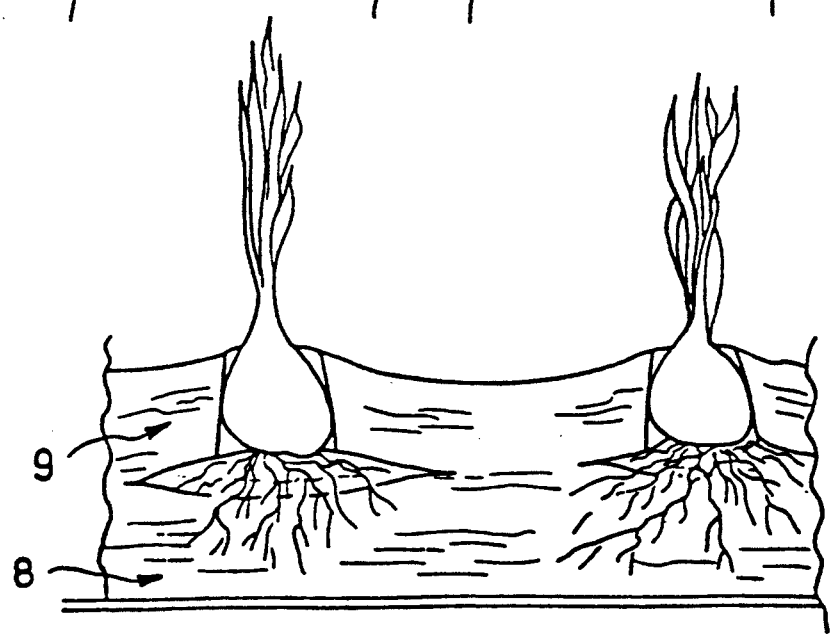
FIG_4

APPARATUS FOR BULB PLANT CULTIVATION

BACKGROUND OF THE INVENTION

1. Field of the Invention

The invention relates to the greenhouse cultivation of bulbs. More precisely, the invention relates to a technique and to an artificial substrate for the cultivation of bulbs.

2. Background of the Related Art

It is known, for the greenhouse cultivation of bulbs, to place the latter under conditions which make possible a first stage of development of the plants, their transport and finally, the completion of the cultivation. These various stages, which meet the needs of the market, are preferably conducted, for practical reasons, on the same substrate.

Thus, it is traditional to use a layer consisting of peat of a thickness on the order of 5 cm for a cultivating substrate of the bulbs, for example tulip bulbs. The bulbs are placed on this material in the arrangement fit for leaving them a suitable space for their growth. They are held in this arrangement by covering the peat with a layer of sand, or with a material of the same nature, which surrounds the bulbs by covering them to a certain height. In this way, the bulbs which are only placed on the peat are held in position during various handlings to which they can be subjected.

This arrangement makes possible a satisfactory cultivation of the bulbs but comes up against some difficulties. Of the latter, it is necessary to mention particularly those difficulties which arise due to transportation of the bulbs. At present, the initial development of the cultivation is often very distant from the final consumption site. For example, the greenhouse cultivation of tulips is very widely developed in the Netherlands, which exports throughout the entire world the bulbs from which flowers are obtained in the country of destination. This trade, which is carried out in sensitive products, largely resorts to means of air transport. For this reason, the weight of the cultivating substrate is of very great importance in the cost. The peat and the sand are very heavy elements and constitute the essential part of the transported weight, the bulbs and the trays representing only a small part.

Another difficulty, linked to the use of the sand, is its instability. The layer of sand that is attached to nothing can be moved in the handling of the trays carrying the bulbs causing a poor distribution of the bulbs in the tray and an unsuitable position of at least some of these bulbs (their position being no longer "vertical").

Other types of substrates have been proposed, in particular synthetic materials such as polymer foams (polystyrene, polyurethane, phenolic resins). In use, however, these materials prove not very satisfactory for various reasons. First, they exhibit less suitable hydrous characteristics. The water retention is lower and consequently necessitates a much more careful monitoring of the conditions under which the conservation and the development of the plants is performed. It also seems that these materials result in a poorer "root colonization." This feature is probably linked to the preceding one. On another plane, the use of substrates is very dependent on their cost. The synthetic foams prove appreciably more costly than the products such as peat and sand. For all these reasons, the synthetic foams are not used in practice by the professionals concerned by the applications considered by this invention.

SUMMARY OF THE INVENTION

The inventors propose a new substrate for the out-of-ground cultivation of bulb plants, a substrate which accompanies the bulb for the entire cultivation including during the transports required by marketing. According to the invention, the cultivation of bulbs is performed on a substrate consisting of a hydrophilic mineral fiber felt in which are made, at regular intervals, open "pockets" on a single face of the substrate, these pockets exhibiting an opening whose dimensions are slightly smaller than those of the bulbs that they receive, and the depth of the pockets being at least sufficient for the positioned bulbs to penetrate the pocket at least to the level of their largest section.

In the substrates used according to the invention, advantageously the material in which the roots develop and the one which makes it possible to hold the bulbs in quite stable positions throughout the cultivation are the same, in contrast to the prior art using a layer of peat and a layer of sand. As is indicated below, the material forming the substrate optionally consists of two elements superposed for reasons of production convenience. But, even in these cases, there is no difference of nature in the materials constituting these two elements. It is always a matter of two superposed mineral fiber felts.

The substrates formed by hydrophilic mineral felts used for other cultivation techniques, in particular for the market-gardening cultivations and which are packaged in the form of "cubes" and "cakes," most commonly have a thickness on the order of 75 mm. Taking into account the specific needs linked to the rooting of the bulbs and to the holding of the latter in their pockets, these felts and a thickness of this order are perfectly suited for the embodiment of the invention.

According to the bulbs being considered and the cultivation conditions, the total thickness of the substrate according to the invention can be different. It is normally not less than 50 mm and not greater than 100 mm.

The selection of the quality of the felts, in particular of their density, is a function in particular of their mechanical properties. If it is preferable, from the point of view of costs, to use light felts, their mechanical resistance is generally restricted. As a general rule, the quality of the felt chosen is such that it maintains a sufficient thickness even when it is completely saturated with water or with a nutritive solution. The acceptable settling, which is a function of the initial thickness, should not, as a general rule, exceed 30% of the initial thickness and is preferably less than 20%. The corresponding density is, according to the nature of the felt, between about 20 kg/m$^3$ and 100 kg/m$^3$. For the glass wool felts, the density is relatively low and is between 20 and 50 kg/m$^3$. For the mineral wool felts, the density ordinarily varies between 40 and 100 kg/m$^3$.

The felt is also to be sufficiently deformable so that the bulbs are inserted in their pockets under the effect of a slight pressure and held in place by the walls with which they are in contact. In other words, the felt elasticity is used to lock the bulbs in position in their pockets.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a view, in diagrammatic section, representing the usual method of cultivation of bulbs;

FIG. 2 is a view similar to FIG. 1, using the arrangements according to the invention;

FIGS. 3a and 3b represent, in section, two configurations according to the invention of pockets receiving the bulbs; and FIG. 4 illustrates one of the features of the development of the plants by using the means proposed by the invention.

DETAILED DESCRIPTION OF THE PREFERRED EMBODIMENTS

In the prior art, the cultivation of bulbs, for example of tulip bulbs, during the winter period is traditionally conducted in trays 1 which support the cultivation substrate. These trays are used to facilitate the handling and the transport of the plants. Their dimensions are preferably standardized to facilitate their storing and their transport.

In the traditional embodiment represented in FIG. 1, tray 1 receives a layer of peat 2 in which the growth of the the cultivation of tulip bulbs exhibits a thickness on the order of 5 cm.

The placing of bulbs 3 is then performed by pressing the latter lightly on the layer of peat to prevent, as much as possible, the latter from falling over. Actually, it is important, for their good growth, that the bulbs present themselves quite "vertically," i.e., the part bearing the roots in contact with the peat and the aerial part upward. In FIG. 1, the plants are represented at a later stage of their development. Initially, the bulbs bear practically no leaves nor roots. At this stage, it is understood that it is very difficult to hold the bulbs in this position. For this reason, a layer of sand 4, whose sole purpose is to stabilize the bulbs, is added. However, during this entire operation, or later during the various handlings, the bulbs can fall over. In all the cases, the operation, because of this instability, lends itself with difficulty to an entirely mechanized placing.

In the first stages of the growth of the plants, some bulbs sometimes do not develop in a satisfactory way. In this case, the horticulturists, anxious to supply "complete" trays, want to be able to replace the weak bulb. In the embodiment represented in FIG. 1, it is clear that the removal of the bulb allows the loose sand to spill into the "pocket" thus freed. When a weak bulb is replaced, it is difficult to assure good contact between the replacement bulb and the underlying peat. The chances of success are thus diminished.

FIG. 2 exhibits a tray 1 in which the substrate according to the invention is used. This substrate 5 includes a thickness of mineral wool felt comprising preformed pockets 6.

In practice, pockets 6 preferably have a circular opening for reasons of production convenience. These pockets are actually advantageously made by rotary tools, such as milling machines, on felt layers cut in suitable dimensions. By way of indication, a traditional dimension is 370×570 mm corresponding to trays of outside dimensions 400×600 mm. For example, 100 pockets for tulip bulbs whose dimensions are on the order of a 40 mm diameter, are placed on trays of this type.

The dimension of the opening of pockets 6 is set appreciably lower than that of the bulbs. The dimension of the orifice is, for example, 10 to 30% smaller than the largest dimension of the bulb which, taking into account the elasticity of the felt, guarantees the immobilization of the bulb in its pocket.

If the cylindrical shape of the pocket is the mos convenient to obtain (FIG. 3a), it is possible to arrange the pockets so as to reinforce the holding of the bulb also. A shape achieved in this sense is represented in FIG. 3b. In this tapered shape, opening 7 of pocket 6 is more narrow than the base so that the walls which surround the bulb tend to push the bulb toward the bottom of the pocket. The accidental extraction of the bulb is thereby made still more difficult.

The depth of the pockets is also proportioned to the dimension of the bulbs to be received by the pockets. It has to be sufficient for the largest section of the bulb to be well engaged in the pocket. Preferably, the depth of the pockets is at least ⅔ of the height of the bulb. Advantageously, this depth does not exceed the height of the bulb. Actually, it should be emphasized that the active part for the growth of the roots is located under the bulb. The material which is located above has as its essential role the holding of the bulb in the chosen position. A depth of the pockets greater than the height of the bulbs does not provide practically any advantages, but it involves the use of thicker, and therefore more costly, felts, being understood that the part located under the bulbs cannot be reduced except to limit the space offered for the development of the roots, which is obviously not desirable.

Independently of the holding of the bulb, the upper part of the felt also intervenes in the characteristics of the cultivation. Actually, if the roots are not developed in this part of the felt, the latter takes part in the hydrous characteristics of the substrate. In contrast to layer of sand 4 of the traditional techniques which retains practically no moisture, the upper part of the felt plays a significant role in the water retention capability of the substrate.

If necessary, to facilitate the formation of the pockets in the substrates according to the invention, it can be preferable to superpose two felt elements. On this assumption, a first felt constitutes the part corresponding to the pockets. This makes it possible, for example, to form these pockets by stamping, which is appreciably quicker than by "scooping out" the latter, as indicated above. Further, the stamping of the felt, taking into account the local deformations that it causes, particularly for the lightest felts and, as a result, the least rigid, can result directly in the formation of the tapered shapes indicated above. When the formation of the substrate from two elements is performed, the element placed in the lower part of course consists of a felt on which it is not necessary to provide a particular shaping. This felt constitutes the "bottom" of the pockets and the part in which the roots are developed. The relative thicknesses of these two elements correspond to their respective role, as indicated above.

When the substrate is formed from two superposed felt strips, it is preferable according to the invention to choose the same material, but it is also possible to choose two mineral felts which differ, for example, in their density to adjust as well as possible the selection of the latter in roles which are proper for them, namely the holding of the bulbs for the upper strip, and the growth of the roots for the lower strip.

When the substrate is formed from two separate felt strips, they can simply be superposed, but it is also possible to bond them. The bonding can be achieved by staples, by needling or by gluing with a binder such as the one, for example, used for making the felt itself.

The felts used in the field of the out-of-ground cultivation are characterized also by the arrangement of their fibers. Traditionally, the most common felts exhibit a "stratified" structure, the felts being positioned randomly in planes approximately parallel to the faces of the felt layer (arrangement which adheres to the method of formation of these felts by deposition on a conveyor of fibers conveyed by a gas stream). It is also known, by other patent applications of the applicant, to use felts in which the initial stratified structure is modified to lead to a more "random" distribution of the fibers without, however, being completely isotropic. The method for obtaining such felts is the object, in particular, of French patent no. 2 548 695.

When a "stratified" felt is used, it is advantageous to find that the development of the roots can be such that the pressure which is exerted on the bulb to drive it from its pocket can bring about a separation of the layers of the felt, as represented in FIG. 4. The partial (or complete) separation of lower layer 8 and upper layer 9, under these conditions, is not detrimental to the good course of the cultivation. The functions of each of these layers are suitably assured, namely development environment of the roots in the lower part and holding in position and verticality of the plant for the upper part.

The separation of the layers that has just been indicated is not "necessary" for holding the bulbs. By using a sufficiently flexible felt, the same advantage of holding the bulb can result from a simple deformation of the felt in the direction of the thickness, the separation of the layers appearing only as the consequence of going beyond the limit of resistance to the uprooting. In all the cases, the important thing is that, whatever the conditions of use may be, the holding effect of the bulb is maintained. Further, if it is desired to avoid this separation of the layers, it is possible to use felts that exhibit a more isotropic distribution of the fibers, as earlier described. These felts resist much better the uprooting stresses that the bulbs can communicate during the growth of the roots.

Weights of trays of the prior art sand and peat type have been compared with the weights of trays employing the present invention. A tray with its reinforcement forming a small cage and comprising a substrate of 370×570 mm carrying 100 tulip bulbs weighs on the order of 20 kg when the traditional layer of peat and of a 50 mm thickness and a layer of sand of a 25 mm thickness is used.

In comparison, when a mineral wool felt whose density is on the order of 70 kg/m$^3$ is used for the same total thickness of 75 mm, the weight is only about 10 kg.

The weight reduction is therefore extremely appreciable and can account for a substantial saving in transport costs.

We have seen that this weight reduction is not the only advantage obtained by the invention and that the stabilization of the bulbs was also important. The advantage of the invention over the prior art is then appreciable, whether the products are intended for distant markets or for the closest markets.

Another advantage also occurs irrespective of the final destination of the bulbs. The "natural" substrates with a peat base can not be guaranteed free from pathogenic germs, such as pythium. Even if a sterilization treatment is performed on the natural substrates (which increases the cost of these products and tends, by the same, to reduce the difference which can exist on this point with the substrates according to the invention), the appearance of species resistant to the sterilization treatment is seen. Advantageously, substrates consisting of mineral wool can be obtained perfectly sterile, and this advantage can be sufficient to justify a preference for the substrates of mineral wool.

Above, examples have been provided concerning the cultivation of tulips. This is not limiting. Any cultivation of bulbs can be considered under similar conditions. Examples of such other bulbs include, but are not limited to hyacinths, irises, tuberoses, gladioluses, jonquils and narcissuses.

What is claimed as new and desired to be secured by Letters Patent of the United States is:

1. An apparatus for cultivating bulbs comprising:
   a rigid tray;
   a two layer hydrophilic mineral wool felt placed on the tray;
   a plurality of pockets formed at regular intervals in only an upper one of the layers of the felt, each pocket having only one opening located at a first face of the felt, each said opening having a diameter slightly smaller than a maximum diameter of a bulb intended to be cultivated in the pocket, and each pocket having a depth sufficient to receive a bulb at least up to the level of the maximum diameter of the bulb.

2. The apparatus according to claim 1, wherein said opening has a diameter between 10 and 30% smaller than said maximum diameter of the bulb.

3. The apparatus according to claim 1 wherein the depth of each pocket is between ⅔ and 1/1 times the height of the bulb to be received therein.

4. The apparatus according to claim 1 wherein said felt has a thickness between 50 mm and 100 mm.

5. The apparatus according to claim 4, wherein the density of the felt is between 20 and 100 kg/m$^3$.

6. The apparatus according to claim 5, wherein the pockets are of cylindrical shape.

7. The apparatus according to claim 5, wherein the pockets are of a tapered shape flaring outward from the opening.

8. The apparatus according to claim 5, wherein the felt is chosen such that the felt does not sink more than 30% when saturated with water.

9. The apparatus according to claim 5, wherein the felt is a felt modified to increase the randomness of its fiber distribution and to thereby decrease the likelihood that the felt will separate into layers when subjected to an uprooting stress in the direction of its thickness.

* * * * *